(12) United States Patent
Rasooli et al.

(10) Patent No.: US 11,980,956 B2
(45) Date of Patent: May 14, 2024

(54) CHAINSAW

(71) Applicant: HUSQVARNA AB, Huskvarna (SE)

(72) Inventors: Alex Rasooli, Jönköping (SE); Peter Björkman, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 487 days.

(21) Appl. No.: 17/289,293

(22) PCT Filed: Nov. 5, 2019

(86) PCT No.: PCT/EP2019/080193
§ 371 (c)(1),
(2) Date: Apr. 28, 2021

(87) PCT Pub. No.: WO2020/094618
PCT Pub. Date: May 14, 2020

(65) Prior Publication Data
US 2021/0402494 A1 Dec. 30, 2021

(30) Foreign Application Priority Data
Nov. 6, 2018 (SE) .................................... 1851377-0

(51) Int. Cl.
*B23D 59/00* (2006.01)
*B25F 5/02* (2006.01)
(Continued)

(52) U.S. Cl.
CPC .............. *B23D 59/002* (2013.01); *B25F 5/02* (2013.01); *B27B 17/0008* (2013.01); *B27B 17/02* (2013.01)

(58) Field of Classification Search
CPC ..... B27B 17/0008; B27B 17/02; B27B 17/00; B27B 17/0025; B27D 59/002;
(Continued)

(56) References Cited

U.S. PATENT DOCUMENTS 2,187,039 A * 1/1940 Kohler ................... D04B 17/04
D3/23
2,758,380 A * 8/1956 Harris .................... G01C 15/12
33/1 LE (Continued)

FOREIGN PATENT DOCUMENTS

DE 102009040436 A1 3/2011
DE 102013111128 A1 4/2015
(Continued)

OTHER PUBLICATIONS

International Search Report and Written Opinion of the International Searching Authority in Application No. PCT/EP2019/080193 dated Jan. 16, 2020.
(Continued)

*Primary Examiner* — Ghassem Alie
(74) *Attorney, Agent, or Firm* — Burr & Forman LLP

(57) ABSTRACT

A chainsaw includes a housing, a guide bar, projecting from the housing, and one or more handles. The guide bar has a main direction of extension defined by its center-line. The housing comprises an outer shell made of plastic, which has at least a first outer groove filled with a contrasting plastic material, wherein the groove at least partly extends straight in a transverse direction that deviates less than 3 degrees from a direction perpendicular to the main direction of extension of the guide bar. This provides an indication that facilitates precise and safe felling of trees.

9 Claims, 2 Drawing Sheets

(51) Int. Cl.
*B27B 17/00* (2006.01)
*B27B 17/02* (2006.01)

(58) Field of Classification Search
CPC .......... B23D 59/001; B25F 5/02; B25F 5/021;
B25F 5/00; Y10T 83/855; Y10T 83/62;
Y10T 83/707
USPC ......... 30/383, 386, 382, 371, 121, 381, 293;
83/522.16, 875; D8/8–9, 61, 62, 64, 65,
D8/70; D21/532
See application file for complete search history.

(56) References Cited

U.S. PATENT DOCUMENTS

| | | | |
|---|---|---|---|
| 4,233,739 A | 11/1980 | Hinrichs | |
| 4,388,762 A | 6/1983 | Debell, Jr. et al. | |
| D412,652 S | 8/1999 | Durr et al. | |
| 6,219,874 B1 * | 4/2001 | van Gelder | A46B 5/0025 |
| | | | 15/201 |
| D558,019 S | 12/2007 | Granberg et al. | |
| D574,207 S | 8/2008 | Arnesson et al. | |
| D633,353 S | 3/2011 | Tinius | |
| D633,766 S | 3/2011 | Tinius | |
| D636,652 S | 4/2011 | Mehra | |
| D729,027 S | 5/2015 | Tinius | |
| D731,868 S | 6/2015 | Tinius | |
| D737,646 S | 9/2015 | Tinius | |
| D741,678 S | 10/2015 | Tinius | |
| D744,308 S | 12/2015 | Tinius | |
| D763,051 S | 8/2016 | Tinius | |
| D826,021 S | 8/2018 | Tinius | |
| D859,950 S | 9/2019 | Dretzka et al. | |
| D902,681 S * | 11/2020 | Näslund | D8/65 |
| 2011/0197458 A1 * | 8/2011 | Karrar | B25F 5/021 |
| | | | 83/522.16 |
| 2011/0232110 A1 * | 9/2011 | Wolf | B27B 17/02 |
| | | | 30/383 |
| 2014/0150271 A1 * | 6/2014 | Yamaoka | B27B 17/14 |
| | | | 30/386 |
| 2015/0047491 A1 | 2/2015 | Schamberg | |

FOREIGN PATENT DOCUMENTS

| | | |
|---|---|---|
| DE | 102015016438 B3 | 11/2016 |
| EP | 0072011 A2 | 2/1983 |
| EP | 1952959 A1 | 8/2008 |
| JP | 2002103301 A | 4/2002 |
| JP | 2008044095 A | 2/2008 |
| WO | 2013142920 A1 | 10/2013 |
| WO | 2018003368 A1 | 1/2018 |

OTHER PUBLICATIONS

Office Action & Search Report for Swedish Application No. 1851377-0 dated Jun. 11, 2019.
Husqvarna,"Husqvarna 545-MK2 Lowes", Retrieved From << https://www.lowes.com/pd/Husqvarna-545-MK2-20-in-50-1-cc-2-Cycle-Gas-Chainsaw/1001279910 >>, Mar. 25, 2020, 7 Pages.

* cited by examiner

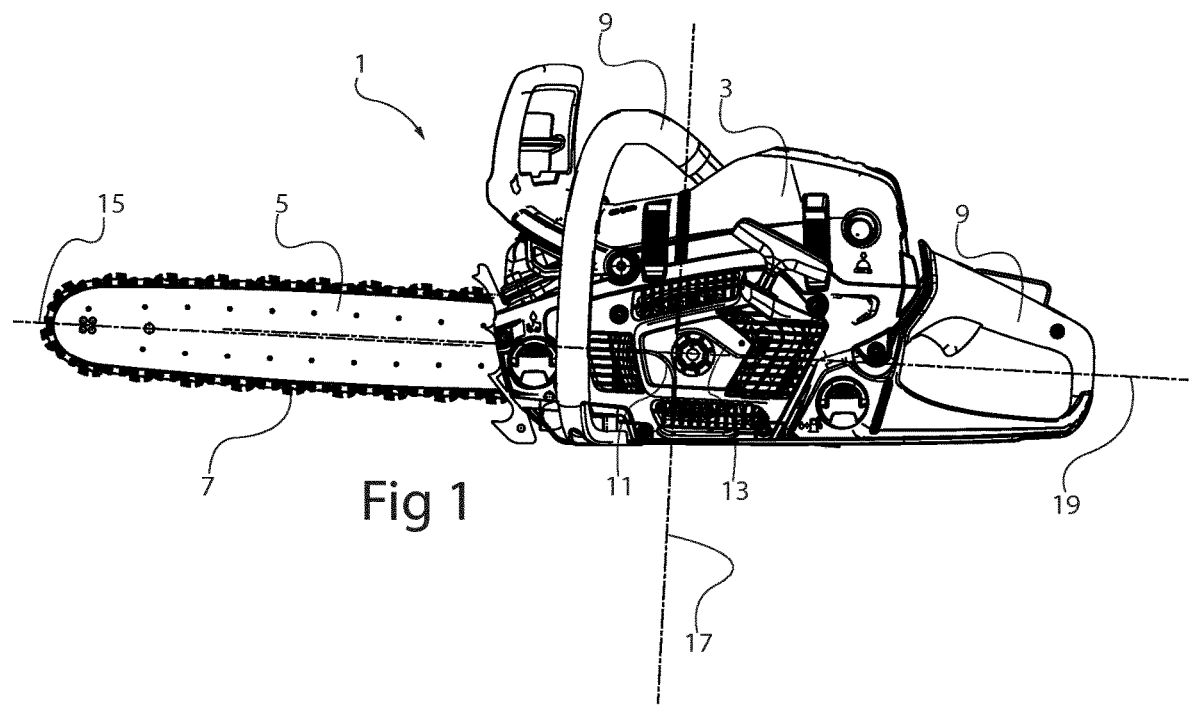
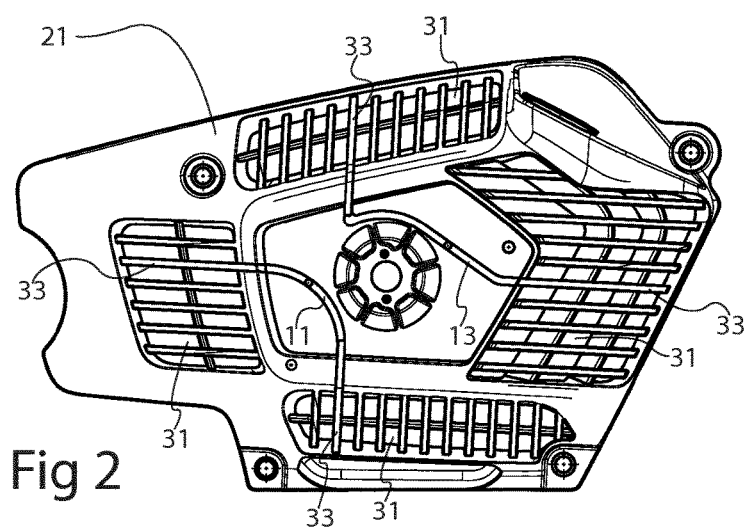

CHAINSAW

TECHNICAL FIELD

The present disclosure relates to a chainsaw comprising a housing, a guide bar, projecting from the housing and being configured to carry a saw chain driven by a motor in the housing, and one or more handles, wherein the guide bar has a proximal end and a distal end, and a main direction of extension defined by the center-line from said proximal end to said distal end.

BACKGROUND

Such a chain saw is described for instance in EP-1952959-A1. One general problem associated with chainsaws is how to facilitate precise and safe felling of trees.

SUMMARY

One object of the present disclosure is therefore to obtain a chain saw that facilitates precise and safe felling of trees.

This object is achieved by means of a chainsaw as defined in claim 1. More specifically, in a chainsaw of the initially mentioned kind, the housing has an outer shell comprising at least a first outer groove filled with a plastic material visually contrasting with other parts of the housing, wherein the groove at least partly extends straight in a transverse direction that deviates less than 3 degrees from a direction perpendicular to the main direction of extension of the guide bar. Such a groove with a contrasting filling may be used to direct the chainsaw during felling of a tree. The top of the tree will land approximately in the transversal direction as seen along the groove. With this configuration, the indication formed by the filled groove will last the entire life length of the chain saw as it cannot be worn off.

The outer shell may further comprise a second outer groove filled with a contrasting plastic material, wherein the second groove at least partly extends straight in a parallel direction that deviates less than 3 degrees from a direction parallel to said main direction of extension of the guide bar. The indication provided by this groove can be used to direct the chainsaw when the sword is inserted in the stem of a large tree.

The first and second grooves may be interconnected by a curved groove portion to form a right-angular groove. This allows both transversal and parallel indications to be provided with a single groove which facilitates production.

Two such right-angular grooves may be provided on opposite sides of a recess in the outer shell, and right-angular parts of the two right-angular grooves may extend along coinciding lines. This conveniently provides longer indications.

The housing may be made of a plastic material, and grooves as well as the contrasting plastic material may be formed in a two-component injection molding process.

The housing may also be made of a light alloy, such as one containing aluminum, zinc or magnesium.

Typically, the groove may be at least 0.5 mm deep, and may be between 1.0 and 3.0 mm wide.

The grooves may be formed in a removable cover of the housing outer shell, e.g. a starter cover, which may be configured to be fitted on the remainder of the outer shell with a snap lock or by means of a screw.

BRIEF DESCRIPTION OF THE DRAWINGS

FIG. 1 illustrates a chainsaw according to the present disclosure.

FIG. 2 shows a starter cover for the chain saw in FIG. 1.

DETAILED DESCRIPTION

Figure 3:
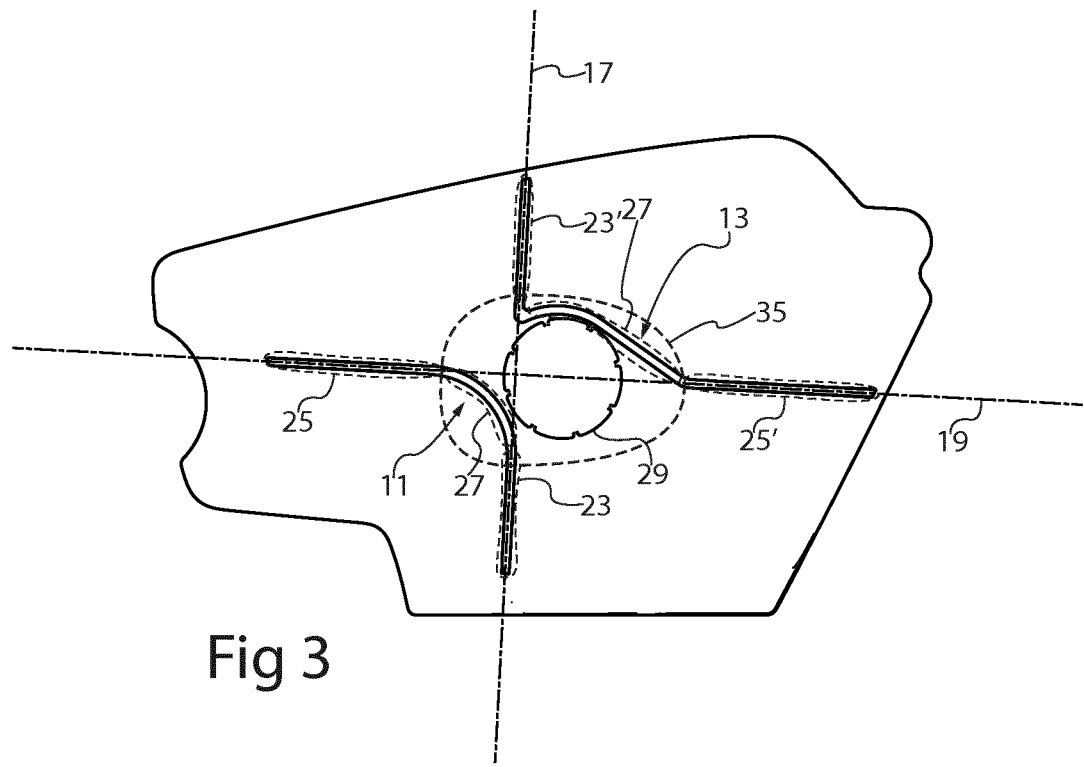
FIG. 3 illustrates the starter cover of FIG. 2 with some details removed.

The present disclosure relates to chainsaws, as illustrated with an example in FIG. 1. The chainsaw 1 comprises a housing 3, and a guide bar 5 projects from the housing 3 and carries a saw chain 7. The saw chain 7 is driven by a motor (not shown) in the housing 3, which motor typically is a combustion engine or an electric motor.

The housing 3 comprises an outer shell, which may at least partly be made of a plastic material such as polyamide, PA, which may typically be reinforced, e.g. with glass fiber. However, examples are possible where the shell or parts thereof are instead made of a light alloy, such as one containing aluminum, zinc or magnesium.

Handles 9 are provided on the housing, in the illustrated case a front and a rear handle, although other configurations are possible. The guide bar 5 has a proximal end, where it is connected to the housing, and an opposite distal end, and a main direction of extension 15 as illustrated in FIG. 1 is defined by the center-line from the proximal to the distal end. Thus far described, the chain saw configuration is well known per se.

The disclosed chain saw further comprises features that help the user to correctly direct the chainsaw by means of the handles to achieve a desired result, typically felling a tree in a correct direction, or to correctly insert the guide bar in the stem of a tree. While this may seem straightforward to a layman, cuts in large trees tend to fully conceal the guide bar during felling, thus making it difficult for the user to assess how the guide bar and the saw chain carry out a cutting operation in the stem of a tree.

The chainsaw of FIG. 1 provides indications, on a face of the housing at least partly approximately parallel with the plane of the guide bar, showing a transverse direction 17, which deviates less than 3 degrees from a direction perpendicular to the aforementioned main direction 15 of extension of the guide bar 5. Preferably, the transverse direction 17 may thus be about perpendicular with the main direction 15. When preparing the felling cut on a tree, the user can use the indications of the transverse direction as the top of the tree, when falling, will fall very close to the elongation of the transverse direction 17, which results in more accurate and safer felling of the tree. It may be useful to provide a small parallax compensation, which turns the transverse direction slightly, about 1.5 degrees, counter-clockwise (not shown) in FIG. 1 as this to some extent compensates for the offset between the indication and the center of the tree, such that the indication or felling mark points even closer to the location where the top of the tree lands.

This indication may be provided in a housing having an outer shell 3 made of plastic using a first 23 outer groove which is filled with a contrasting plastic material, as will be discussed further. The groove at least partly extends straight in the transverse direction 17.

Similarly, there may be provided a second outer groove 25, which at least partly extends straight in a parallel direction 19, indicated in FIG. 1, that deviates less than 3 degrees from a direction parallel to the main direction of extension 15 of the guide bar. This allows the user to verify a straight insertion of the guide bar in a log even when the guide bar is no longer visible, which is useful when cutting down large trees.

Such an indication in the parallel direction may be useful also in the absence of an indication in the transverse direction. The present disclosure thus considers a chainsaw comprising a housing, a guide bar, projecting from the housing and being configured to carry a saw chain driven by a motor in the housing, and one or more handles, wherein the guide bar has a proximal end and a distal end, and a main direction of extension defined by the center-line from said proximal end to said distal end, and where the housing has an outer shell, comprising at least one outer groove filled with a plastic material contrasting with other parts of the housing, wherein the groove at least partly extends straight in a parallel direction that deviates less than 3 degrees from a direction parallel to the main direction of extension of the guide bar.

FIG. 2 shows a removable cover 21, e.g. a starter cover for the chain saw in FIG. 1. Typically, the first and second outer grooves 11, 13 indicating the aforementioned transversal and/or parallel directions are formed in the cover 21 (or other housing part) by means of a 2-component injection molding process, which process is well known per se. The first and second outer grooves 11, 13 may also be described as the first and second filled grooves or the first and second right-angular grooves. This cover 21 may be removable and may therefore be a relatively small part.

As shown, the cover 21 may comprise a number of vent openings 31 for cooling, and the grooves may then be designed to follow ribs 33 crossing the vents. Typically, the first and second outer grooves may be about 1.6 mm, but at least 0.5 mm deep to facilitate two-component injection molding. The width of the groove may typically be between 1.0 and 3.0 mm wide to be clearly visible and still provide an accurate indication of direction.

The first and second outer grooves 11, 13 may be filled with the same material as the cover as a whole, if the cover is made of plastic, although with a contrasting color, for instance forming a contrasting dark, e.g. black, lines on a lighter, e.g. orange, background, or vice versa, such that it is clearly visible. It is also possible to use a different plastic material, e.g. a thermoplastic material of a rubber-type material. A two-component injection molding process may give cross links at the interface between the materials with contrasting colors giving a chemical bond, such that they essentially form a single piece. Reinforcing the plastic in the groove is not necessary.

FIG. 3 illustrates the starter cover of FIG. 2 with some details (vents) removed to facilitate explanation. In this part, a mid-portion recess 29 is provided to accommodate fastening means allowing the cover to be attached to the remainder of the chainsaw for instance with a screw or using a snap-fit.

As illustrated there may be provided the first and second outer grooves 11, 13 as two right-angular grooves at opposite sides of the recess 29, although one is sufficient.

A first outer groove 11 that may be provided as right-angular groove comprises a first 23 and a second 25 straight portion, one 23 extending in the transverse direction and another 25 extending in the parallel direction 19. The first and second straight portions 23, 25 may be interconnected by a curved groove portion 27, such that both straight and mutually right-angular parts can be formed by a single first outer groove 11 in a two-component injection molding process using the curved portion as a flow channel. It is possible to cover curved portions, for instance with a sticker 35, as indicated.

Figure 4:
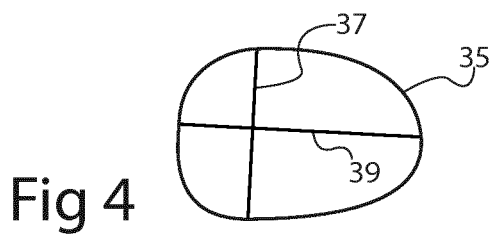
FIG. 4 illustrates an example of an optional sticker that can be attached to the cover of FIG. 3.

As shown, the second outer groove 13 may be provided as a second right-angular groove and can be formed on the other side of the mid-portion 29 of the cover 21, formed by first and second straight portions 23', 25' and an interconnecting curved groove portion 27'. Further, the first straight portions 23, 23' of the first and second outer grooves 11, 13 may extend along coinciding lines as shown, as can the second straight portions 25, 25' of the first and second outer grooves 11, 13. This provides a longer overall indication along the transverse and parallel directions. If a sticker 35 is provided over the curved portions, the sticker may itself comprise markings in the transverse and parallel directions 17, 19, for instance one line 37 connecting the straight portions 23, 23' in the transverse direction, and another 39 connecting the straight portions 25, 25' in the parallel direction, as illustrated in FIG. 4. There could however be other configurations, such as a smaller cross or a set of dots, etc.

The present disclosure is not limited to the above-described examples and may be varied and altered in different ways within the scope of the appended claims. For instance, even if the grooves are provided on a cover or lid such as shown, indications may be formed on a fixed part f the housing, or corresponding indications may continue in elongated directions on other parts of the housing, and not necessarily provided in grooves.

The invention claimed is:

1. A chainsaw comprising a housing, a guide bar, projecting from the housing and being configured to carry a saw chain driven by a motor in the housing, and one or more handles, wherein the guide bar has a proximal end and a distal end, and a main direction of extension defined by a center-line from said proximal end to said distal end, wherein the housing is defined by an outer shell, wherein said outer shell comprises at least a first outer groove filled with a plastic material contrasting in color with other parts of the housing, wherein the first outer groove at least partly extends straight in a transverse direction that deviates less than 3 degrees from a direction perpendicular to said main direction of extension of the guide bar, wherein said outer shell comprises a second outer groove filled with a contrasting plastic material, wherein the second outer groove at least partly extends straight in a parallel direction that deviates less than 3 degrees from a direction parallel to said main direction of extension of the guide bar, and wherein the first and second outer grooves are interconnected by a curved groove portion to form right-angular grooves.

2. The chainsaw according to claim 1, wherein the first and second right-angular grooves are provided on opposite sides of a recess in the outer shell.

3. The chainsaw according to claim 2, wherein straight portions of the first and second right-angular grooves extend along coinciding lines.

4. The chainsaw according to claim 1, wherein the housing is made of a plastic material and the first and second outer grooves as well as the contrasting plastic material are formed in a two-component injection molding process.

5. The chainsaw according to claim 4, wherein the first and second outer grooves are at least 0.5 mm deep.

6. The chainsaw according to claim 4, wherein the first and second outer grooves are between 1.0 and 3.0 mm wide.

7. The chainsaw according to claim 1, wherein the housing is made of an alloy containing aluminum, zinc or magnesium.

8. The chainsaw according to claim 1, wherein the first and second outer grooves are formed in a removable cover of the housing outer shell.

9. The chainsaw according to claim 8, wherein the removable cover is configured to be fitted on the remainder of the outer shell with a snap-lock or by means of a screw.

* * * * *